US006775737B1

(12) United States Patent
Warkhede et al.

(10) Patent No.: US 6,775,737 B1
(45) Date of Patent: Aug. 10, 2004

(54) METHOD AND APPARATUS FOR ALLOCATING AND USING RANGE IDENTIFIERS AS INPUT VALUES TO CONTENT-ADDRESSABLE MEMORIES

(75) Inventors: Priyank Ramesh Warkhede, Santa Clara, CA (US); William N. Eatherton, San Jose, CA (US); Shyamsundar N. Maniyar, San Jose, CA (US); Peram Marimuthu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 360 days.

(21) Appl. No.: 09/973,508

(22) Filed: Oct. 9, 2001

(51) Int. Cl.[7] .......................... G06F 12/00; G11C 15/00
(52) U.S. Cl. .......................................... 711/108; 365/49
(58) Field of Search ............................... 711/108, 158; 365/49

(56) References Cited

U.S. PATENT DOCUMENTS

| | | | |
|---|---|---|---|
| 5,088,032 A | 2/1992 | Bosack | |
| 5,319,763 A | 6/1994 | Ho et al. | |
| 5,481,540 A | 1/1996 | Huang | |
| 5,515,370 A | 5/1996 | Rau | |
| 5,528,701 A | 6/1996 | Aref | |
| 5,651,099 A | 7/1997 | Konsella | |
| 5,721,899 A | 2/1998 | Namba | |

(List continued on next page.)

OTHER PUBLICATIONS

Donald R. Morrison, "Patricia—Practical Algorithm to Retrieve Information Coded in Alphanumeric," Journal of the ACM, vol. 15, No. 4, Oct. 1968, pp. 514–534.
Waldvogel et al., "Scalable High Speed IP Routing Lookups," Proc. SIGCOMM '97, ACM, 1997, pp. 25–36.

Lampson et al., "IP Lookups Using Multiway and Multicolumn Search," Proc. Infocom 98, Mar. 1998, 24 pages.
V. Srinivasan and George Varghese, "Faster IP Lookups using Controlled Prefix Expansion," ACM SIGMETRICS Performance Evaluation Review, vol. 26 No. 1, Jun. 1998, p. 1–10.
Stefan Nilsson and Gunnar Karlsson, "Fast Address Look–up for Internet Routers," Proceedings of IEEE Broadband Communications, Apr. 1998, 12 pages.
William N. Eatherton, Hardware–Based Internet Protocol Prefix Lookups, Master's thesis, Server Institute, Washington University, St. Louis, MO, May 1999, 109 pages.
Lampson et al., "IP Lookups Using Multiway and Multicolumn Search," IEEE Transactions on Networking, vol. 7, No. 3, Jun. 1999, pp. 324–334.

(List continued on next page.)

Primary Examiner—Jack A. Lane
(74) Attorney, Agent, or Firm—The Law Office of Kirk D. Williams

(57) ABSTRACT

Methods and apparatus are disclosed for allocating and using range identifiers as input values to associative memories, especially binary content-addressable memories (CAMs) and ternary content-addressable memories (TCAMs). In one implementation, each of multiple non-overlapping intervals are identified with one of multiple unique identifiers. An indication of a mapping between the multiple non-overlapping intervals and the multiple unique identifiers is maintained. A particular unique identifier is determined from said multiple unique identifiers based on a value and said multiple non-overlapping intervals. A lookup operation is performed on an associative memory using the particular unique identifier to generate a result. One implementation uses a trie representation of a range tree of the intervals to derive the unique identifiers. Moreover, one implementation evaluates and selects among various possible trie representations, especially to determine identifiers such that a TCAM prefix may match multiple intervals corresponding to a desired range.

42 Claims, 7 Drawing Sheets

U.S. PATENT DOCUMENTS

| | | | |
|---|---|---|---|
| 5,740,171 | A | 4/1998 | Mazzola et al. |
| 5,781,772 | A | 7/1998 | Wilkinson, III et al. |
| 5,809,501 | A | 9/1998 | Noven |
| 5,829,004 | A | 10/1998 | Au |
| 5,842,040 | A | 11/1998 | Hughes et al. |
| 5,848,416 | A | 12/1998 | Tikkanen |
| 5,884,297 | A | 3/1999 | Noven |
| 5,898,689 | A | 4/1999 | Kumar et al. |
| 5,920,886 | A | 7/1999 | Feldmeier |
| 5,930,359 | A | 7/1999 | Kempke et al. |
| 5,956,336 | A | 9/1999 | Loschke et al. |
| 6,000,008 | A | 12/1999 | Simcoe |
| 6,018,524 | A | 1/2000 | Turner et al. |
| 6,061,368 | A | 5/2000 | Hitzelberger |
| 6,067,574 | A | 5/2000 | Tzeng |
| 6,091,725 | A | 7/2000 | Cheriton et al. |
| 6,097,724 | A | 8/2000 | Kartalopoulos |
| 6,115,716 | A | 9/2000 | Tikkanen et al. |
| 6,141,738 | A | 10/2000 | Munter et al. |
| 6,148,364 | A | 11/2000 | Srinivasan et al. |
| 6,181,698 | B1 | 1/2001 | Hariguchi |
| 6,236,658 | B1 | 5/2001 | Essbaum et al. |
| 6,237,061 | B1 | 5/2001 | Srinivasan et al. |
| 6,243,667 | B1 | 6/2001 | Kerr et al. |
| 6,289,414 | B1 | 9/2001 | Feldmeier et al. |
| 6,295,576 | B1 | 9/2001 | Ogura et al. |
| 6,298,339 | B1 | 10/2001 | Bjornson |
| 6,307,855 | B1 | 10/2001 | Hariguchi |
| 6,532,516 | B1 * | 3/2003 | Krishna et al. ............ 711/108 |
| 6,574,701 | B2 * | 6/2003 | Krishna et al. ............ 711/108 |
| 6,633,953 | B2 * | 10/2003 | Stark ......................... 711/108 |

OTHER PUBLICATIONS

Lockwood et al., "Field Programmable Port Extender (FPX) for Distributed Routing and Queuing," Proceedings of the ACM/SIGDA international symposium on Field programmable gate arrays, Feb. 2000, pp. 137–144.

Ruiz-Sanchez et al., "Survey and Taxonomy of IP Address Lookup Algorithms," IEEE Network Magazine, vol. 15, No. 2, Mar./Apr. 2001, pp. 8–23.

Pankaj Gupta and Nick McKewon, "Algorithms for Packet Classification," IEEE Network Magazine, vol. 15, No. 2, Mar./Apr. 2001, pp. 24–32.

Iyer et al., "ClassiPI: An Architecture for Fast and Flexible Packet Classification," IEEE Network Magazine, vol. 15, No. 2, Mar./Apr. 2001, pp. 33–41.

Waldvogel et al., "Scalable High Speed Prefix Matching," ACM Transactions on Computer Systems, vol. 19, No. 4, Nov. 2001, pp. 440–482.

Jon P. Wade and Charles G. Sodini, "A Ternary Content Addressable Search Engine," IEEE Journal of Solid-State Circuits, vol. 24, No. 4, Aug. 1989, pp. 1003–1013.

Teuvo Kohonen, Content-Addressable Memories, 1987, pp. 128–129 and 142–144, Springer-Verlang, New York.

Brian Dipert, ed., "Special-purpose SRAMs Smooth the Ride," EDN, Jun. 24, 1999, pp. 93–104.

"Extending the LANCAM Comparand," Application Brief AB–N3, Rev. 1.0a Draft, Music Semiconductors, Milpitas, CA, Sep. 30, 1998, 4 pages.

"Advantages of CAM in ASIC-Based Network Address Processing," Application Brief AB–N11, Rev. 1.2a Draft, Music Semiconductors, Milpitas, CA, Sep. 30, 1998, 4 pages.

"Virtual Memory Applications of the MU9C1480A LAN-CAM," Application Note AN–N3, Rev. 1a, Music Semiconductors, Milpitas, CA, Sep. 30, 1998, 12 pages.

"Using the MU9C1965A LANCAM MP for Data Wider than 128 Bits," Application Note AN–N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note, AN–N25, Rev. 0a, Music Semiconductors, Milpitas, CA, Oct. 1, 1998, 16 pages.

"Using MUSIC Devices and RCPs for IP Flow Recognition," Application Note AN–N27, Rev. 0, Music Semiconductors, Milpitas, CA, Oct. 21, 1998, 20 pages.

"Wide Ternary Searches Using Music CAMs and RCPs," Application Note AN–N31, Rev. 0, Music Semiconductors, Milpitas, CA, Apr. 13, 1999, 8 pages.

* cited by examiner

| DATA STRUCTURE 300 | 301 | 302 |
|---|---|---|
| 1 | INTERVAL - 1 | IDENTIFIER - 1 |
| 2 | INTERVAL - 2 | IDENTIFIER - 2 |
| ⋮ | ⋮ | ⋮ |
| N | INTERVAL - N | IDENTIFIER - N |

| INTERVAL VALUES 401 | TRIE INDENTIFIERS 402 |
|---|---|
| 0 | 00 |
| 80 | 01 |
| 1024 | 10 |
| 8080 | 11 |

410

EXEMPLARY RANGE ONE:   80-1024    0110

420

EXEMPLARY RANGE TWO:   0-80   { 0001
                                0X

METHOD AND APPARATUS FOR ALLOCATING AND USING RANGE IDENTIFIERS AS INPUT VALUES TO CONTENT-ADDRESSABLE MEMORIES

FIELD OF THE INVENTION

This invention especially relates to performing range lookup operations using associative memory devices, especially in communications and computer systems that employ content-addressable memories; and more particularly, the invention relates to allocating and using range identifiers as input values to content-addressable memories.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for access control lists (ACLs) and forwarding decisions is a demanding part of switch and router design. This packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

One known approach uses binary and/or ternary content-addressable memories to perform packet classification. Ternary content-addressable memories allow the use of wildcards in performing their matching, and thus are more flexible than binary content-addressable memories. These content-addressable memories are expensive in terms of power consumption and space, and are limited in the size of an input word on which a lookup operation is performed as well as the number of entries (e.g., 72, 144, etc.) which can be matched.

Various applications that use packet classification, such as Security Access Control, Quality of Service etc., may use arbitrary ranges of values (such as port numbers or packet length) as one of the classification criteria. For example, a certain operation may be performed on packets have a port range between 80 and 1024. It would be desirable to have a single or limited number of entries in a content-addressable memory than for an entry of each port (e.g., 80, 81, 82, . . . 1024).

One previous known attempt produces a resultant bitmap identifying to which of multiple ranges a certain value resides. Such a device is preprogrammed with a set of ranges and generates an bitmap output with the number of bits being as large as the number of range intervals, which may consume a large number of bits in the content-addressable memories. Needed are new methods and apparatus for performing range operations in relation to content-addressable memories.

SUMMARY OF THE INVENTION

Systems and methods are disclosed for allocating and using range identifiers as input values to content-addressable memories. In one embodiment, each of multiple non-overlapping intervals are identified with one of multiple unique identifiers. An indication of a mapping between the multiple non-overlapping intervals and the multiple unique identifiers is maintained. A particular unique identifier is determined from said multiple unique identifiers based on a value and said multiple non-overlapping intervals. A lookup operation is performed on an associative memory using the particular unique identifier to generate a result.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
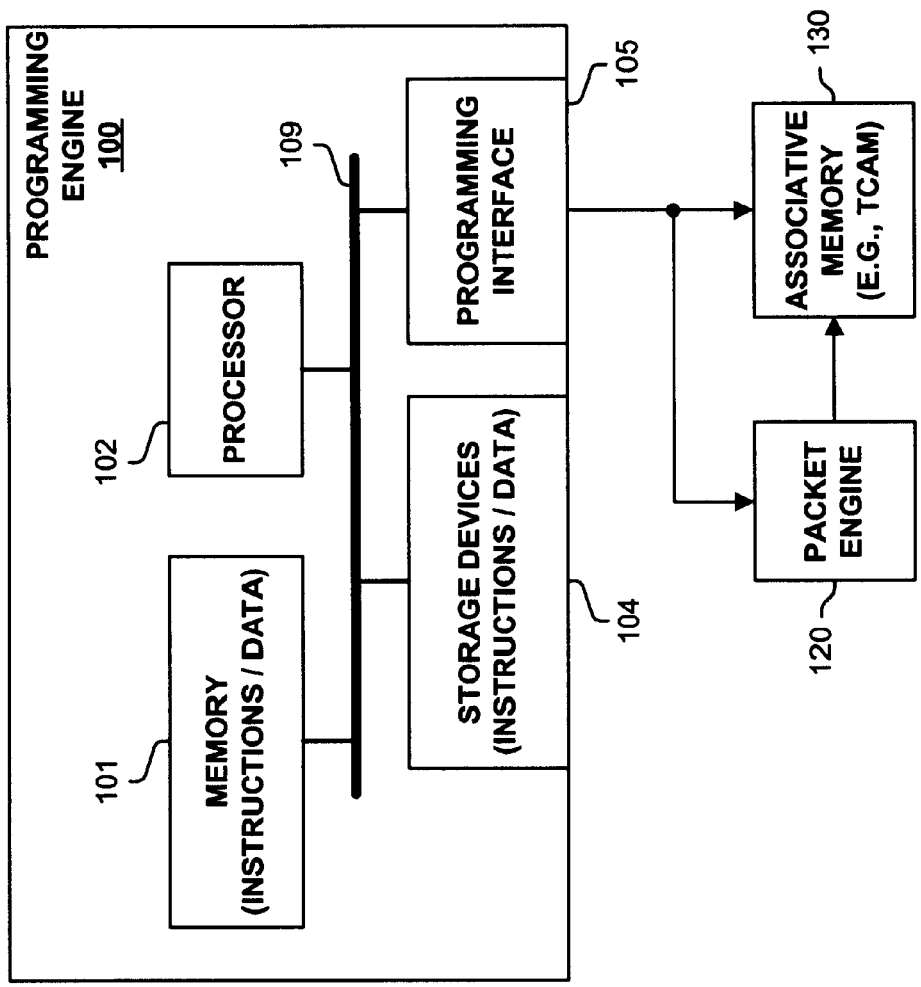
FIGS. 1 and 2A are block diagrams of embodiments for allocating and using range identifiers as input values to content-addressable memories.

Methods and apparatus are disclosed for allocating and using range identifiers as input values to associative memories, especially binary content-addressable memories (CAMs) and ternary content-addressable memories (TCAMs). Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps and processing of signals and information illustrated in the figures are typically be performed in a different serial or parallel ordering and/or by different components in various embodiments in keeping within the scope and spirit of the invention. Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information.

In one view, a trie is a directed path through a binary tree with each path through the tree qualified by a unique result. This unique result is typically codified by the path taken with a one or zero representing a left or right path taken to reach the desired node. A prefix is typically a string of characters that appears at the beginning of a longer string of characters. In many cases of practical interest the characters in a prefix are binary digits (i.e., ones and zeroes). A prefix is sometimes terminated by an asterisk, a symbol which represents the remaining arbitrary binary digits in a longer, fixed-length string.

Methods and apparatus are disclosed for allocating and using range identifiers as input values to associative memories, especially binary content-addressable memories (CAMs) and ternary content-addressable memories (TCAMs). In one embodiment, each of multiple non-overlapping intervals are identified with one of multiple unique identifiers. An indication of a mapping between the multiple non-overlapping intervals and the multiple unique identifiers is maintained. A particular unique identifier is determined from said multiple unique identifiers based on a value and said multiple non-overlapping intervals. A lookup operation is performed on an associative memory using the particular unique identifier to generate a result. One embodiment uses a trie representation of a range tree of the intervals to derive the unique identifiers. Moreover, one embodiment evaluates and selects among various possible trie representations, especially to determine identifiers such that a TCAM prefix may match multiple intervals corresponding to a desired range.

FIG. 1 illustrates one embodiment of a system, which may be part of a router or other communications or computer system, for allocating and using range identifiers as input values to associative memories. In one embodiment, programming engine 100 partitions a relevant information space into multiple ranges of values, such as those important to access control lists and routing decisions in a router. These ranges are partitioned into a set of non-overlapping intervals with each being assigned a unique identifier. Packet engine 120 and associative memory 130 are programmed with these unique identifiers and/or prefixes based on the unique identifiers.

In one embodiment, programming engine 100 assigns these unique identifiers based on a trie representation of the intervals. Moreover, in one embodiment, programming engine 100 evaluates different possible trie or other representations of the intervals and selects a particular representation, typically for some optimization purpose. For example, one representation and thus selection of unique identifiers may reduce the number of entries required, especially when associative memory 130 includes a prefix matching devices such as a TCAM. For example, one representation may be selected such that certain ranges may be matched using a prefix value that encompasses two or more relevant non-overlapping intervals.

In one embodiment, programming engine 100 includes a processor 102, memory 101, storage devices 104, and programming interface 105, which are electrically coupled via one or more communications mechanisms 109 (shown as a bus for illustrative purposes). Various embodiments of programming engine 100 may include more or less elements. The operation of programming engine 100 is typically controlled by processor 102 using memory 101 and storage devices 104 to perform one or more tasks or processes. Memory 101 is one type of computer-readable medium, and typically comprises random access memory (RAM), read only memory (ROM), flash memory, integrated circuits, and/or other memory components. Memory 101 typically stores computer-executable instructions to be executed by processor 102 and/or data which is manipulated by processor 102 for implementing functionality in accordance with the invention. Storage devices 104 are another type of computer-readable medium, and typically comprise solid state storage media, disk drives, diskettes, networked services, tape drives, and other storage devices. Storage devices 104 typically store computer-executable instructions to be executed by processor 102 and/or data which is manipulated by processor 102 for implementing functionality in accordance with the invention.

As used herein and contemplated by the invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Figure 2A:
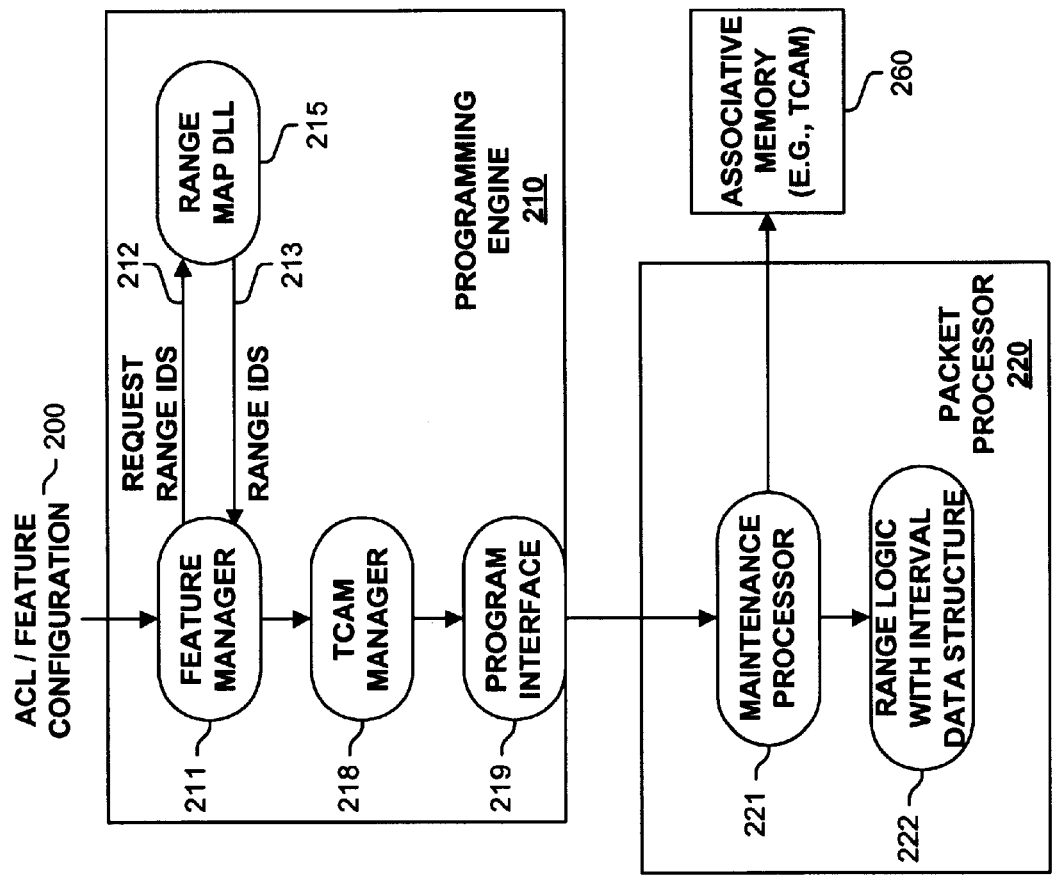

FIG. 2A illustrates one embodiment of a system, which may be part of a router or other communications or computer system, for allocating and using range identifiers as input values to associative memories. In one embodiment, programming engine 210 receives an access control list (ACL) and/or other feature configuration information 200. A feature management module 211 receives this information 200 and communicates a range identifier request 212 to range map dynamic-link library (DLL) 215 which analyzes and produces a set of range/interval unique identifiers 213. Identifiers 213 and possibly received configuration information 200 is forwarded by feature manager module 211 to TCAM manager 218 and then to program interface 219, and then on to maintenance processor 221 of packet processor 220. Maintenance processor 221 then updates range logic with interval data structure 222 and programs associative memory 260.

Figure 2B:
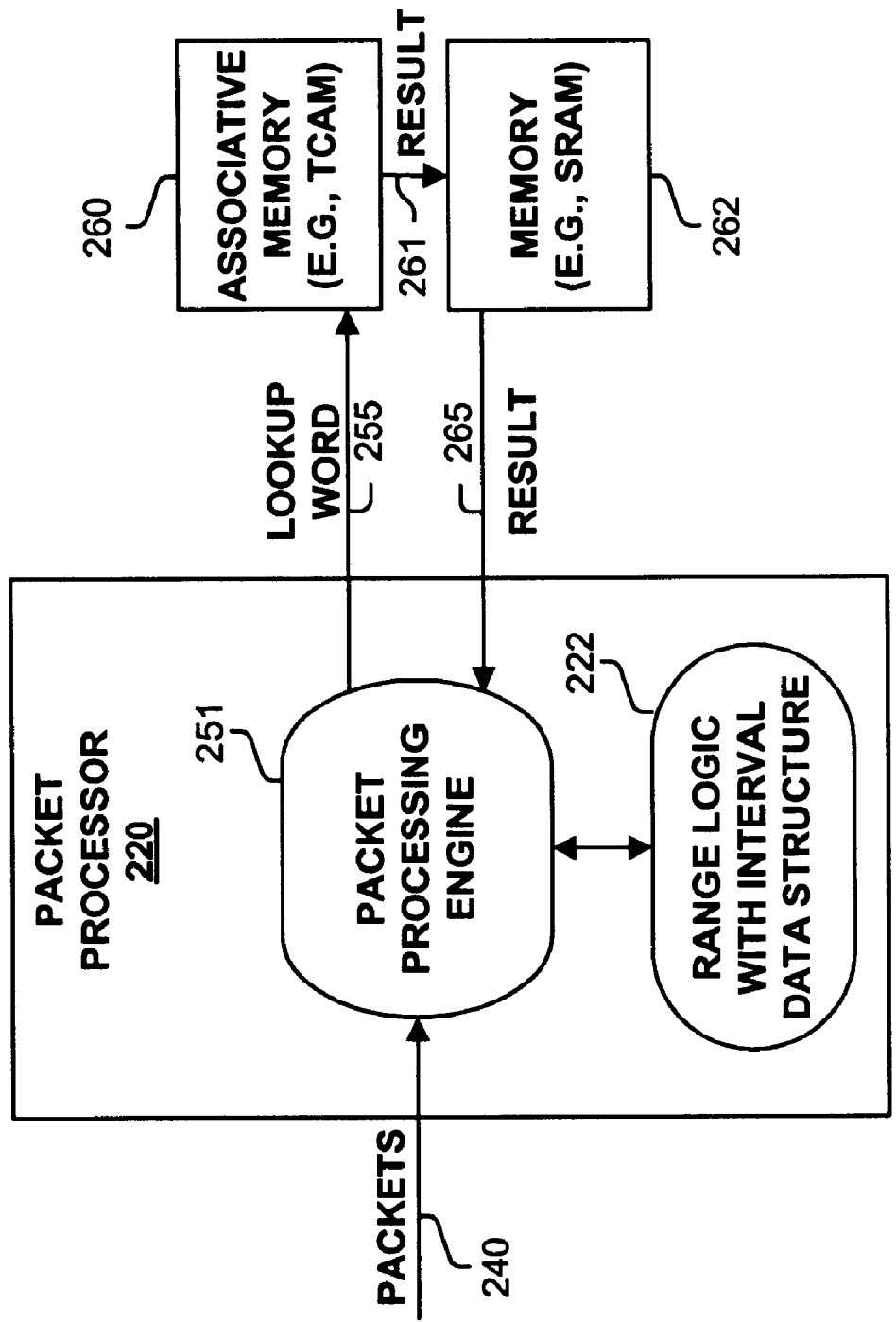
FIG. 2B is a block diagram of an embodiment performing packet processing according to the invention.

FIG. 2B illustrates one aspect of the processing of packets 240 by packet processor 220. Packets 240 are received by packet processing engine 251 which consults range logic with interval data structure 222 to generate a lookup word 255 for use by associative memory 260. Associative memory 260 produces a result 261, which is typically used as input to a memory (e.g., SRAM) 262 to produce a result 265 for use by packet processor 220. In one embodiment, result 261 is returned directly to packet processor 220.

The operations of the embodiments illustrated in FIGS. 1, 2A and 2B are further described in relation to FIGS. 3, 4A–C, and 5A–B.

Figures 3, 4A:
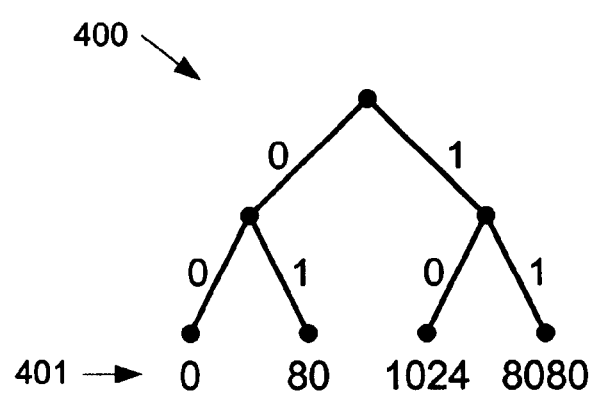
FIG. 3 is a block diagram of a data structure used in one embodiment to maintain multiple interval corresponding unique identifiers.
FIGS. 4A–C illustrate one mapping of ranges and/or intervals to identifiers, and in particular, into trie derived identifiers.

FIG. 3 illustrates a data structure 300 which is used in one embodiment to maintain interval information. Data structure 300 corresponds to a data structure maintained in one embodiment of memory 101 (FIG. 1) and/or in range logic with interval data structure 222 (FIGS. 2A–B). Data structure 300 maintains a list of interval values 301 and a corresponding identifier 302 for each interval. In one embodiment, an index or other value associated with data structure 300 is used in place of, or in addition to each identifier 302.

Figures 4B, 4C:
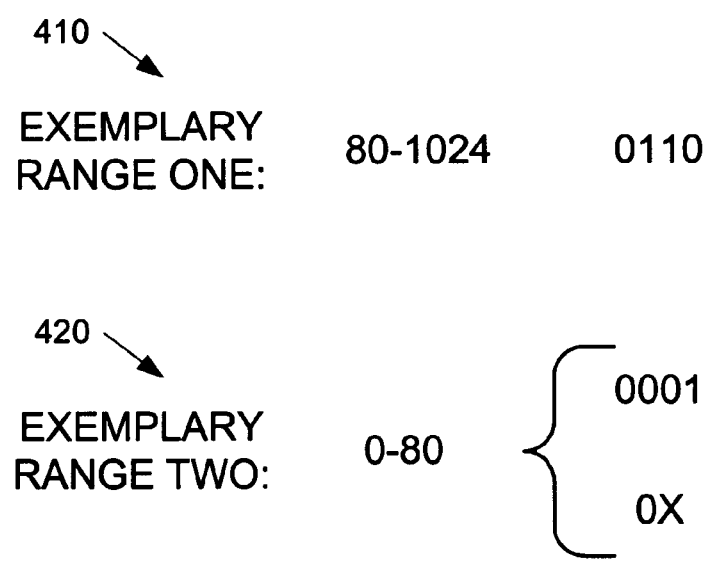

FIGS. 4A–C illustrate one of an unlimited number of methods of determining a unique identifier for a corresponding range interval. For ease of understanding, FIGS. 4A–C use an exemplary set of interval edges (i.e., 0, 80, 1024, 8080). Of course, any set of intervals may be used in accordance with the invention.

FIG. 4A illustrates one trie representation 400 of these intervals 401. FIG. 4B illustrates one set of unique trie identifiers 402 associated with each of the intervals 401. As shown, these trie unique identifiers are just the corresponding patch through trie representation 400.

FIG. 4C illustrates some mappings of ranges (e.g., a contiguous numerical space encompassing one or more intervals). Exemplary range one 410 illustrates the range of 80–1024 identified with the trie value of 80 concatenated with the trie value of 1024, or the string or prefix "0110". Exemplary range two 420 illustrates the range of 0–80 identified one way by the trie value of 0 concatenated with the trie value of 80, or the string or prefix "0001". Additionally, this range could be represented by the prefix "0*". Thus, a TCAM could use the entry "0*" to match exemplary range two 420. This consolidation of identifiable values may allow TCAMs to be programmed more efficiently.

Figure 5A:
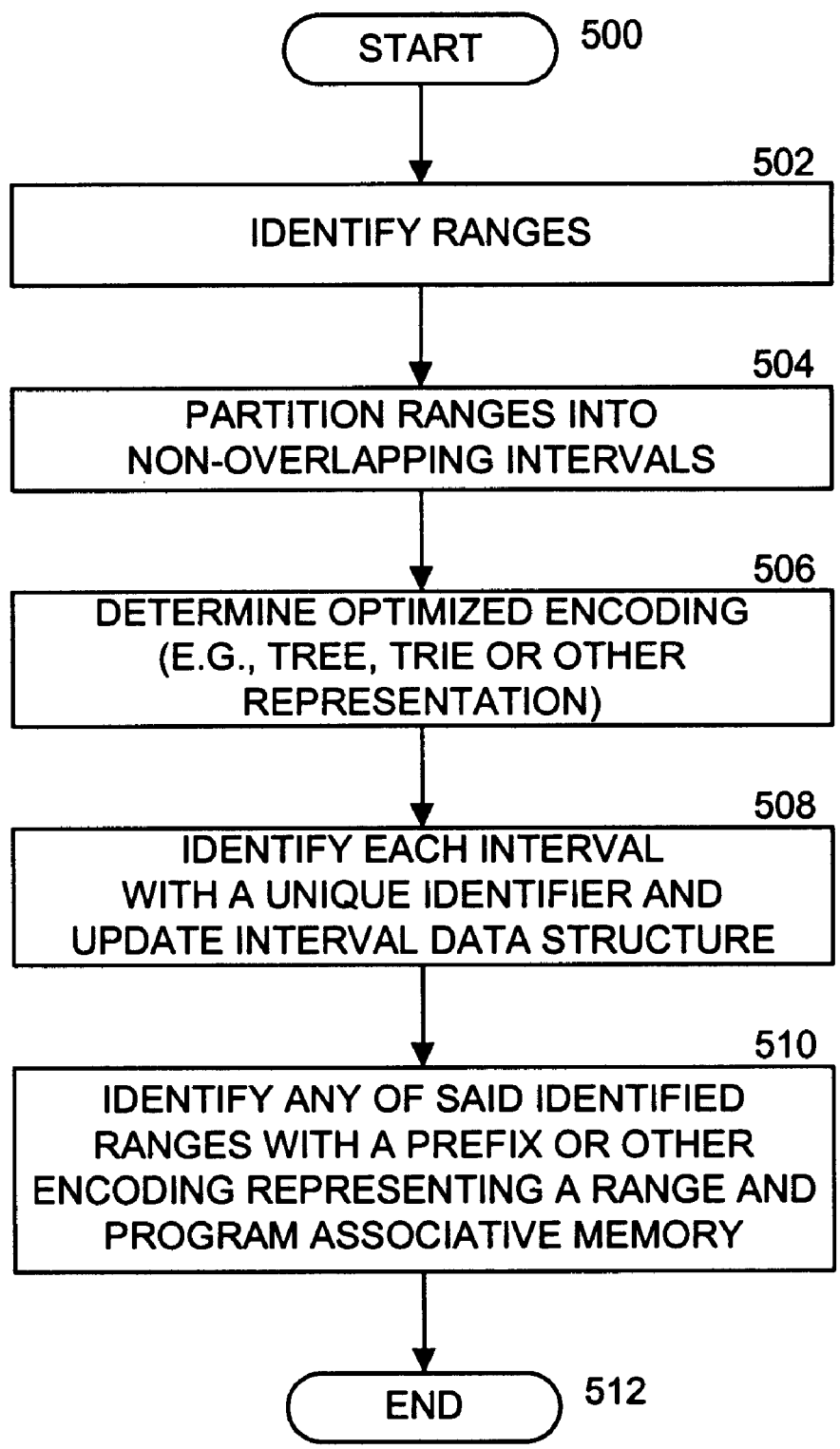
FIGS. 5A–B are flow diagrams of exemplary processes used in one of numerous embodiments for allocating and using range identifiers as input values to content-addressable memories.

FIG. 5A illustrates a process used in one embodiment for allocating and using range identifiers as input values to content-addressable memories. Processing begins with process block 500, and proceeds to process block 502, wherein the set of ranges are identified. Next, in process block 504, these ranges are partitioned into non-overlapping intervals.

Optionally, in process block 506, an optimized encoding of the intervals and ranges are determined, such as determining unique identifiers for non-overlapping intervals in a manner such that ranges can be readily identified by prefixes, which are especially useful in embodiments employing a TCAM.

In one embodiment, an optimized allocation of range identifiers is performed by a dynamic program on cost of allocation (number of TCAM entries) for each possible value of the tuple (left point, right point, number of bits taken for encoding). Typically, this operation is performed separately on source port ranges and destination port ranges, as well as for any other appropriate matching fields or criteria.

One such process first pre-processes the range data by first expanding any ranges that can be expanded into prefixes with small cost are expanded and eliminated from range identifier allocation, and any ranges that can be expanded. Prefixes with not a very large cost, and are not used very frequently are expanded into prefixes.

Next, different configurations of a range tree are constructed and evaluated. One such embodiment can be described as follows.

First, a sorted array of endpoints is created. Each range [ij]=[ij+1) gives endpoints "i" and "j+1". The array of endpoints will henceforth be denoted by endpoint[ ]. The array is sorted in increasing order from left to right.

Next, unit interval number "i" corresponds to [endpoint [i], endpoint[i+1]). Note that intervals (–infinity,0) and (MAX_PORT_NUMBER, infinity) are not used by any ranges and these are not defined as per convention. Note the convention here—unit interval will refer to any interval defined by successive endpoints, while as interval will generally refer to a range of addresses defined by any two non-successive endpoints.

Next, for each interval, initialize cost, weight, left and right values. Cost of interval [endpoint[i],endpoint[j]) denoted by cost[i][j], is defined as number of TCAM entries that will contain a prefix corresponding to that range of addresses. Initial value for cost[i][j][k] is 0 for all unit intervals, and infinity otherwise. Weight of an interval is equal to total weight of all ranges with exactly the same endpoints as the interval. left[i][j] is sum of weights of all ranges that have left endpoint between endpoints of interval [endpoint[i],endpoint[j]).

Then an optimal cost matrix is calculated. Optimal cost of range trie using "k" bits between [endpoint[i], endpoint[j]) using "r" as root of trie is expressed as:

$$\mathrm{cost}[i][j][k] = \text{infinity for } i+1 > j$$

$$\mathrm{cost}[i][j][k] = \text{initialized value for } i+1 = j$$

$$\mathrm{cost}[i][j][k] = \mathrm{cost}[i][r][k-1] + \mathrm{cost}[r][j][k-1] + \mathrm{left}[i][r] + \mathrm{right}[r][j] - \mathrm{weight}[i][j]$$

which is minimized over all possible $i < r < j$.

The value of r that minimizes this cost is selected as the root of the optimal trie. Using the cost[ ] matrix computed above, the root trie node is created that minimizes cost, and children that correspond to left and right sub-intervals created by that endpoint. Note that in the optimal trie, nodes corresponding to endpoint values 0 and the largest value can be ignored as they are leaf nodes, below which there is only one unit interval.

Next, in process block 508, each interval is identified with a unique identifier and the interval data structure is updated. In one embodiment, the selected trie is traversed and a bit string representation is created for each node (e.g., interval). Note, these bit strings may be of varying length. In one embodiment, an in-order traversal of the optimal trie is performed. For each non-leaf node, create lookup table entry (node→value, node→result). Let leftmost(x) denote the leftmost leaf node (node with smallest node→value) in the subtrie rooted at x. Then node→result is generated by padding leftmost(node→right_child)→value by any arbitrary bit string (e.g., using 0's or 1's).

Next, in process block 510, each of the identified ranges are assigned a prefix or other encoding representation of a range or interval, and the associative memory is programmed using these encodings. In one embodiment, for each range [endpoint[i], endpoint[j]), the optimal trie is traversed starting from root node. At any node:

If both endpoints of the range are in the sub-trie rooted at that node, do not output any value.

If both endpoints are in left or right subtrie, go down to the corresponding child node.

If both endpoints are not in either left or right subtrie, change state to OUTPUT mode.

If in OUTPUT mode, if left endpoint of range is in left subtrie, output prefix corresponding to right child and go to left child node.

If in OUTPUT mode, if right endpoint of range is in right subtrie, output prefix corresponding to left child and go to right child node.

Processing of the flow diagram illustrated in FIG. 5A is then complete as indicated by process block 512.

One embodiment further provides mechanisms for adding and removing entries without having to perform the entire programming operations. In one embodiment, a new range may be added in the following manner.

1. For any endpoint of the range that is not already present in the range trie, insert endpoint as follows:

a. Traverse the range trie searching for endpoint.

b. If endpoint exists in the trie, search will terminate at some non-leaf node. Don't need to insert endpoint.

c. Else, search will terminate in a leaf node.

d. Path length from root to this leaf node is the number of bits used to represent this unit interval. If maximum available bits are already used, insertion of new endpoint fails.

e. Otherwise: The leaf node represents a unit interval, within which is the new endpoint. So inserting endpoint will split this unit interval into two unit intervals. So convert the leaf node into an internal node of trie by setting node→compare_value=endpoint and creating two leaf children (corresponding to the newly split unit intervals).

f. With these change, note that no existing range map changes. Any range map refers to the prefix representation of existing trie nodes, which remain at the same location relative to root.

g. However, the lookup table changes. One new entry needs to be created for the leaf node that was converted to an internal node. Also, for the node which had used the leaf node as leftmost(node→right), the new leftmost (node→right) node will be leaf_node→left. So only two range lookup table entries need to be updated.

2. If both endpoints are successfully inserted in range trie (or they already exist), the range map is generated from the new range.

3. Otherwise, the range must be expanded into prefixes.

4. NOTE: If only one endpoint is inserted in trie, and second insert fails, the first endpoint may be deleted in order to minimize accumulating garbage.

In one embodiment, a range may be deleted in the following manner. Note, the removal of a range does not necessarily imply removal of its endpoints. In one embodiment, a use count is maintained for all endpoints in the range trie. If use count of an endpoint falls to zero, it can potentially be removed. One embodiment of a process for checking and removing an endpoint is now described.

1. Walk down the tree searching for endpoint. Let node denote the corresponding tree node.

2. If node has any child that is an internal (i.e., non-leaf) node of the tree, node cannot be removed without affecting any existing range maps. In order to avert any large scale update of TCAM entries, defer deletion of node.

3. If the only children of node are leaves, then delete endpoint by converting node into a leaf.

4. At this point, check whether use-count of parent(node) is zero. If so, it can be a node whose deletion was deferred, as in step (2). The parent(node) is then deleted.

Figure 5B:
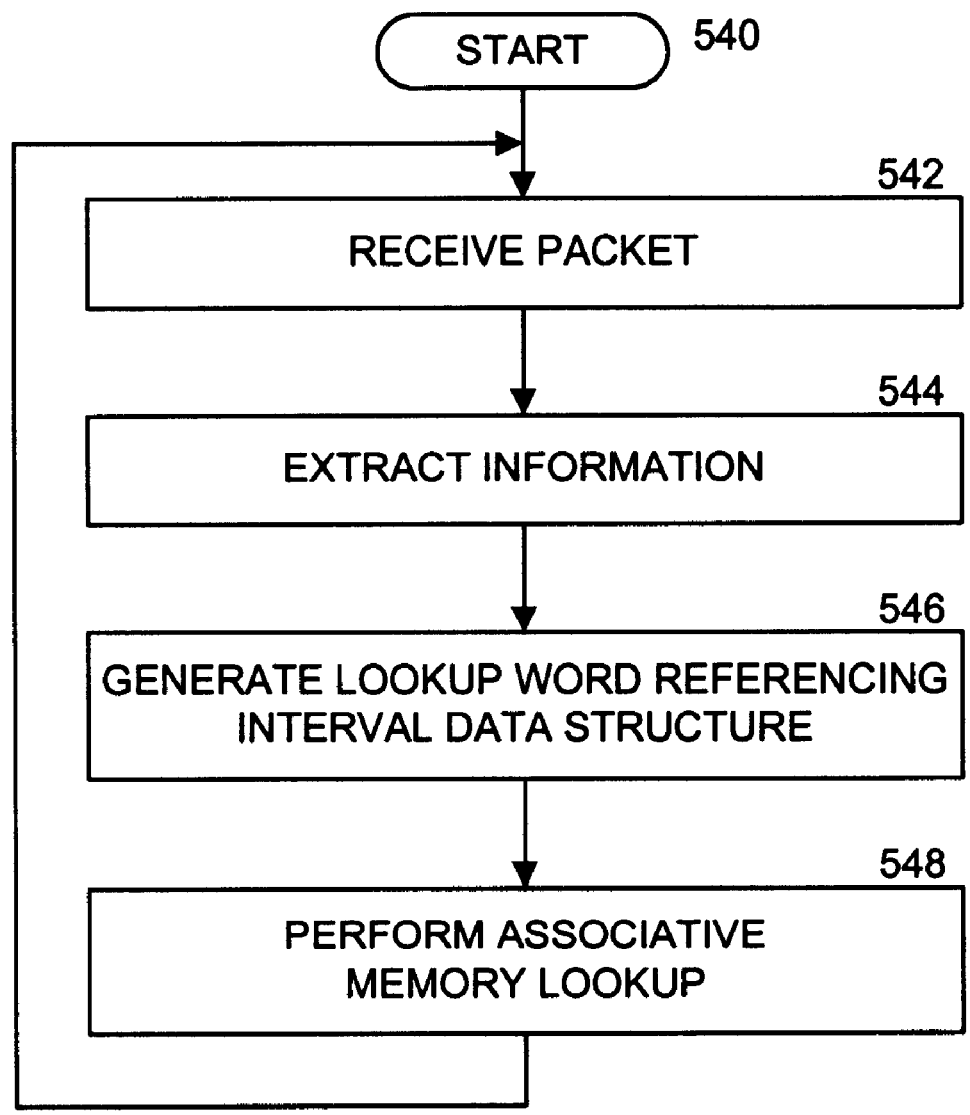

FIG. 5B illustrates a process used in one embodiment for processing information. Note, this processing is described in terms of receiving and processing packets. However, the invention is not so limited, and may be used for processing any type of information.

Processing begins with process block 540, and proceeds to process block 542, wherein a packet is received. Next, in process block 544, information (e.g., port fields, source address, destination address, service type, or other packet header or data fields) is extracted on which to perform the match and lookup. Next, in process block 546, a lookup word value is generated with reference to the programmed interval data structure. Next, in process block 548, the programmed associative memory performs the lookup operation. Processing returns to process block 542 to receive and process more packets.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method comprising:

identifying each of a plurality of non-overlapping intervals with one of a plurality of unique identifiers;

maintaining an indication of a mapping between the plurality of non-overlapping intervals and the plurality of unique identifiers;

determining a particular unique identifier from said plurality of unique identifiers based on a value and said plurality of non-overlapping intervals; and performing a lookup operation on an associative memory using the particular unique identifier to generate a result.

2. The method of claim 1, further comprising partitioning a plurality of ranges into the plurality of non-overlapping intervals.

3. The method of claim 1, wherein said identifying each of the plurality of non-overlapping intervals with one of the plurality of unique identifiers includes:
   determining at least two different sets of values for the plurality of unique identifiers; and
   selecting one of said at least two different sets of values for the plurality of unique identifiers.

4. The method of claim 3, wherein said one of said at least two different sets of values for the plurality of unique identifiers is associated with a minimal cost, wherein said cost is defined as a number of ternary content-addressable entries.

5. The method of claim 1, wherein said identifying each of the plurality of non-overlapping intervals with one of the plurality of unique identifiers includes:
   determining at least two different mappings between the plurality of non-overlapping intervals and the plurality of unique identifiers; and
   selecting one of said at least two different mappings between the plurality of non-overlapping intervals and the plurality of unique identifiers.

6. The method of claim 1, said identifying each of the plurality of non-overlapping intervals with one of the plurality of unique identifiers includes determining a trie representation of the plurality of non-overlapping intervals.

7. The method of claim 1, wherein said identifying each of the plurality of non-overlapping intervals with one of the plurality of unique identifiers includes:
   determining at least two different trie representations of the plurality of non-overlapping intervals; and
   selecting one of said at least two different trie representations.

8. The method of claim 7, wherein said selecting one of said at least two different trie representations includes evaluating each of said at least two different trie representations for prefixes that would match two or more of the plurality of non-overlapping intervals.

9. The method of claim 1, further comprising programming the associative memory with an entry that matches at least two unique identifiers of said plurality of unique identifiers.

10. The method of claim 9, wherein the entry includes a prefix.

11. The method of claim 1, wherein the associative memory includes a binary or ternary content-addressable memory.

12. The method of claim 1, wherein the value includes a port number, an address, or a service characteristic.

13. The method of claim 12, further comprising receiving a packet including the port number, the address, or the service characteristic.

14. The method of claim 1, wherein said identifying each of the plurality of non-overlapping intervals with one of the plurality of unique identifiers includes performing a tree analysis on at least two different sets or mappings of the plurality of unique identifiers.

15. The method of claim 14, wherein said tree analysis includes analyzing a resultant set of trie representations of said at least two different sets or mappings of the plurality of unique identifiers.

16. A computer-readable medium containing computer-executable instructions for performing the method of claim 15.

17. The method of claim 1, wherein said performing a lookup operation on an associative memory using the particular unique identifier to generate a result includes performing a lookup operation in the associative memory based on a lookup word including the particular unique identifier.

18. The method of claim 17, wherein the associative memory is a ternary content-addressable memory such that each particular entry of the associative memory matches the lookup word if each bit of the lookup word is equal to each corresponding non-masked bit of said particular entry.

19. The method of claim 17, wherein the associative memory is a binary content-addressable memory such that each particular entry of the associative memory matches the lookup word if each bit of the lookup word is equal to each corresponding bit of said particular entry.

20. An apparatus comprising:
    a storage mechanism configured to maintain an indication of a mapping between a plurality of non-overlapping intervals and a plurality of unique identifiers;
    a range logic to determine a particular unique identifier from said plurality of unique identifiers based on a value and said plurality of non-overlapping intervals; and
    an associative memory to perform a lookup operation using the particular unique identifier to generate a result.

21. The apparatus of claim 20, further comprising a programming engine for determining the mapping between the plurality of non-overlapping intervals and the plurality of unique identifiers.

22. The apparatus of claim 21, wherein the programming engine includes an associative memory programmer to program the associative memory.

23. The apparatus of claim 21, wherein the programming engine includes an analyzer for performing an analysis on at least two different sets or mappings of the plurality of unique identifiers.

24. The apparatus of claim 23, wherein the programming engine includes a selection mechanism for selecting one of said at least two different sets or mappings of the plurality of unique identifiers.

25. The apparatus of claim 23, wherein the analyzer performs a tree analysis on at least two different sets or mappings of the plurality of unique identifiers.

26. The apparatus of claim 25, wherein said tree analysis includes analyzing a resultant set of trie representations of said at least two different sets or mappings of the plurality of unique identifiers.

27. The apparatus of claim 20, wherein said to perform a lookup operation using the particular unique identifier includes to perform a lookup operation using a lookup word including the particular unique identifier.

28. An apparatus comprising:
    means for identifying each of a plurality of non-overlapping intervals with one of a plurality of unique identifiers;
    means for maintaining an indication of a mapping between the plurality of non-overlapping intervals and the plurality of unique identifiers;
    means for determining a particular unique identifier from said plurality of unique identifiers based on a value and said plurality of non-overlapping intervals; and
    means for performing a lookup operation on an associative memory using the particular unique identifier to generate a result.

29. The apparatus of claim 28, further comprising means for partitioning a plurality of ranges into the plurality of non-overlapping intervals.

30. The apparatus of claim 28, wherein said means for identifying each of the plurality of non-overlapping intervals with one of the plurality of unique identifiers includes:

means for determining at least two different sets of values for the plurality of unique identifiers; and means for selecting one of said at least two different sets of values for the plurality of unique identifiers.

31. The apparatus of claim 28, wherein said means for identifying each of the plurality of non-overlapping intervals with one of the plurality of unique identifiers includes:

means for determining at least two different mappings between the plurality of non-overlapping intervals and the plurality of unique identifiers; and means for selecting one of said at least two different mappings between the plurality of non-overlapping intervals and the plurality of unique identifiers.

32. The apparatus of claim 28, said means for identifying each of the plurality of non-overlapping intervals with one of the plurality of unique identifiers includes means for determining a trie representation of the plurality of non-overlapping intervals.

33. The apparatus of claim 28, wherein said means for identifying each of the plurality of non-overlapping intervals with one of the plurality of unique identifiers includes:

means for determining at least two different trie representations of the plurality of non-overlapping intervals; and means for selecting one of said at least two different trie representations.

34. The apparatus of claim 33, wherein said means for selecting one of said at least two different trie representations includes means for evaluating each of said at least two different trie representations for prefixes that would match two or more of the plurality of non-overlapping intervals.

35. The apparatus of claim 28, further comprising means for programming the associative memory with an entry that matches at least two unique identifiers of said plurality of unique identifiers.

36. The apparatus of claim 35, wherein the entry includes a prefix.

37. The apparatus of claim 28, wherein the associative memory includes a binary or ternary content-addressable memory.

38. The apparatus of claim 28, wherein the value includes a port number, an address, or a service characteristic.

39. The apparatus of claim 38, further comprising means for receiving a packet including the port number, the address, or the service characteristic.

40. The apparatus of claim 28, wherein said means for identifying each of the plurality of non-overlapping intervals with one of the plurality of unique identifiers includes means for performing a tree analysis on at least two different sets or mappings of the plurality of unique identifiers.

41. The apparatus of claim 40, wherein said means for tree analysis includes means for analyzing a resultant set of trie representations of said at least two different sets or mappings of the plurality of unique identifiers.

42. The apparatus of claim 28, wherein said means for performing a lookup operation on an associative memory using the particular unique identifier to generate a result includes means for performing a lookup operation in the associative memory based on a lookup word including the particular unique identifier.

* * * * *

UNITED STATES PATENT AND TRADEMARK OFFICE
CERTIFICATE OF CORRECTION

PATENT NO. : 6,775,737 B1
DATED : August 10, 2004
INVENTOR(S) : Warkhede et al.

It is certified that error appears in the above-identified patent and that said Letters Patent is hereby corrected as shown below:

Column 2,
Line 35, replace "interval" with -- intervals and --.

Column 6,
Line 32, replace "[ij]=[ij+1)" with -- [i,j] = [i,j+1] --.

Signed and Sealed this

Twenty-seventh Day of September, 2005

JON W. DUDAS
*Director of the United States Patent and Trademark Office*